United States Patent [19]

MacMaster

[11] Patent Number: 5,661,925
[45] Date of Patent: Sep. 2, 1997

[54] TREE TRUNK PROTECTION BAND AND LOCK

[76] Inventor: Ross Lee MacMaster, 1665 Spruce Drive, Caledon, Ontario, Canada, L0N 1C0

[21] Appl. No.: 372,056

[22] Filed: Jan. 12, 1995

[51] Int. Cl.⁶ .......................... A01G 13/10; A01G 17/00
[52] U.S. Cl. .................. 47/23; 52/588.1; 52/582.1
[58] Field of Search .................... 47/23; 405/216; 160/135; 52/582.1, 582.2, 588.1

[56] References Cited

U.S. PATENT DOCUMENTS

| | | |
|---|---|---|
| 933,654 | 9/1909 | Lippincott ....................... 47/23 |
| 2,782,561 | 2/1957 | Smith . |
| 4,266,385 | 5/1981 | Oehlert ....................... 52/588.1 |
| 4,267,679 | 5/1981 | Thompson ....................... 52/588.1 |
| 4,642,938 | 2/1987 | Georges et al. . |
| 4,955,156 | 9/1990 | Williams . |
| 5,048,229 | 9/1991 | Campbell . |
| 5,050,362 | 9/1991 | Tal et al. ....................... 52/588.1 |
| 5,060,416 | 10/1991 | Rohde ....................... 47/23 |

FOREIGN PATENT DOCUMENTS

| | | | |
|---|---|---|---|
| 432099 | 7/1911 | France ....................... 47/23 |
| 2800811 | 7/1979 | Germany ....................... 52/582.1 |
| 3540-828-A | 5/1987 | Germany . |
| 3715632 | 10/1987 | Germany ....................... 47/23 |
| 403191169 | 8/1991 | Japan ....................... 52/582.1 |
| 10998 | of 1908 | United Kingdom . |
| 2168582 | 6/1986 | United Kingdom . |

*Primary Examiner*—Terry Lee Melius
*Assistant Examiner*—Joanne C. Downs
*Attorney, Agent, or Firm*—Gifford, Krass, Groh, Sprinkle, Patmore, Anderson & Citkowski, P.C.

[57] ABSTRACT

The invention relates to an improved tree guard for protecting the bark of young trees and shrubs from mechanical damage caused by landscaping and lawn maintenance equipment. The tree guard includes at least one generally rectangular, flexible sheet which may be temporarily or permanently bent into a cylindrical shape sufficiently large to encircle a tree at ground level. Longitudinal releasable locking strips are provided to attach the ends of the sheet together to hold the sheet in the desired shape. The locking strips incorporate a tab and groove attachment system with each tab and groove having retaining beads running therealong to hold each tab within a cooperating groove. Preferably, the tab and groove of each locking strip are oriented perpendicularly to the plane of the sheet at the point of attachment of the strip to the sheet. The cooperating strips may be identical in shape so that the tab of one fits into the groove of another and vice versa. A process of constructing a tree guard according to the invention is also provided in which the sheet material and the locking strip material are extruded, cut to length and then spot welded together in the appropriate orientation.

8 Claims, 3 Drawing Sheets

TREE TRUNK PROTECTION BAND AND LOCK

BACKGROUND AND SUMMARY OF THE INVENTION

The invention relates to an improved tree guard for protecting the tender, immature bark of young trees, in general, young fruit trees, decorative trees and shrubbery, and a lock adapted to be used in such a tree guard.

The bark of young trees includes a vital but fragile vascular layer that is crucial to the survival of the tree. Water and nutrients move from the roots to the tips of the highest branches through the vascular layer. If however, the vascular layer is damaged by an injury to the bark, the nutrients are cut off from certain parts of the tree.

In time, the vascular tissue comes to be protected by a thick cork layer commonly known as bark. The thicker the bark becomes the better it protects the vascular layer. Early in a tree's life, however, the young, thin bark is insufficient to prevent mechanical damage to the vascular layer and ensuing loss of tree vitality. Moreover, some fruit trees and other commercially valuable trees continue to be vulnerable to such damage throughout a large portion of their life span. It has therefore been recognized for some time that it is desirable to protect the fragile bark and its underlying vascular layer through the use of a tree or plant guard fully or partially encircling the tree.

A number of different types of styles and shapes of tree guards have been devised. These range from thin, flexible, coiled guards, which are intended to prevent rodent damage only, to elaborately designed guards designed to protect the tree's roots and base while limiting competition for the tree's resources. It is also known to use short lengths of plastic corrugated weeping tile with a split formed down one side to protect the base of the trees. However, plastic tile is relatively stiff, difficult to work with and sometimes tends to slice into the tree during installation due to the sharp edges of the required split.

U.S. Pat. No. 2,782,561 issued to Smith teaches a plastic guard that is both a bedding edge for the tree and ostensibly a tree guard. U.S. Pat. No. 5,048,229 issued to Campbell, teaches a rigid tree guard made of perforated plastic pipe. U.S. Pat. No. 4,642,938, issued to Georges et al., teaches a rigid conical tree guard and anti-frost device which is fastened together at a fastening flange running up the outside of the guard. Paper and burlap wrapping materials are also known but will not stand up to repeated mechanical damage.

The known tree guards that prevent some forms of mechanical damage require either a relatively complex structure or additional fastening components adapted to hold the guard in place around the tree. It has not hitherto been possible to simply and inexpensively protect young or fragile trees and saplings from impact injuries with a tree guard of simple installation and manufacture.

In addition, it is desirable in some circumstances that lawn maintenance equipment such as lawn mowers and line trimmers be used to trim grass or weeds immediately adjacent to a tree without damaging the tree itself. Such lawn equipment can cause serious impact damage to unprotected bark either through forceful low velocity impact by the body of the device on the tree or through high velocity impact by a rotating cutting line or blade, or by a projectile thrown thereby against the tree. In order to protect trees from such damage, it is necessary to ensure not only that the lawn equipment is prevented from impacting the tree but also that the guard itself will cause as little damage as possible to the tree should it be propelled against the tree. Accordingly, substantially rigid tree guards are not desirable for use where such equipment must be brought very close to a tree. It has not hitherto been possible to provide a tree guard that will permit use of such equipment immediately adjacent to a tree while significantly reducing the chance of undesirable impact damage to the tree.

It is an object of this invention to provide a tree guard that is simple to use and inexpensive to manufacture, and which offers protective capabilities superior to those offered by the prior art. It is also an object of the present invention to provide a process for the manufacture of such tree guards in an economical and inexpensive manner. It is also an object of this invention to provide a locking mechanism adopted to be used in a tree guard of the type described herein.

According to one broad aspect of the invention, there is provided a tree guard having a generally rectangular, single sheet of flexible plastic, a first elongate locking strip and a second elongate locking strip. The flexible plastic sheet has a first face, a second face, a first end and a second end. The sheet is bendable so as to form a cylinder with the first end adjacent to the second end. The first locking strip is attached to and runs along the first end of the sheet. The first locking strip includes a bottom wall, an inner side wall and an outer side wall which define a groove. A retaining bead runs along one of the side walls. The second locking strip includes a locking flange, which is generally complementary in shape to the groove in the first locking strip, and retaining means for engaging the retaining bead of the first locking strip when the second locking strip is inserted into the groove. The second locking strip is attached to the second end of the sheet and arranged generally parallel to the first locking strip.

According to another broad aspect of the invention, there is provided a locking strip having an elongate base portion and an elongate, flexible, L-shaped flange attached thereto. The base portion includes an inner side wall. The L-shaped flange includes a bottom wall and an outer side wall. The bottom wall runs along the inner side wall and projects generally perpendicularly therefrom a first distance. The outer side wall runs along the bottom wall and projects generally perpendicularly a second distance so that the inner side wall, the bottom wall and the outer side wall define a U-shaped groove. The outer side wall has a thickness no greater than the first distance. A retaining bead runs along the outer side wall and is spaced from the bottom wall a third distance, the third distance being greater than one-half of the second distance.

BRIEF DESCRIPTION OF THE DRAWINGS

A preferred embodiment of the invention both as to its operation and construction, together with the advantages thereof, may best be understood by reference to the following detailed description taken in conjunction with the accompanying drawings, wherein.

DESCRIPTION OF THE PREFERRED EMBODIMENTS

Figure 1:
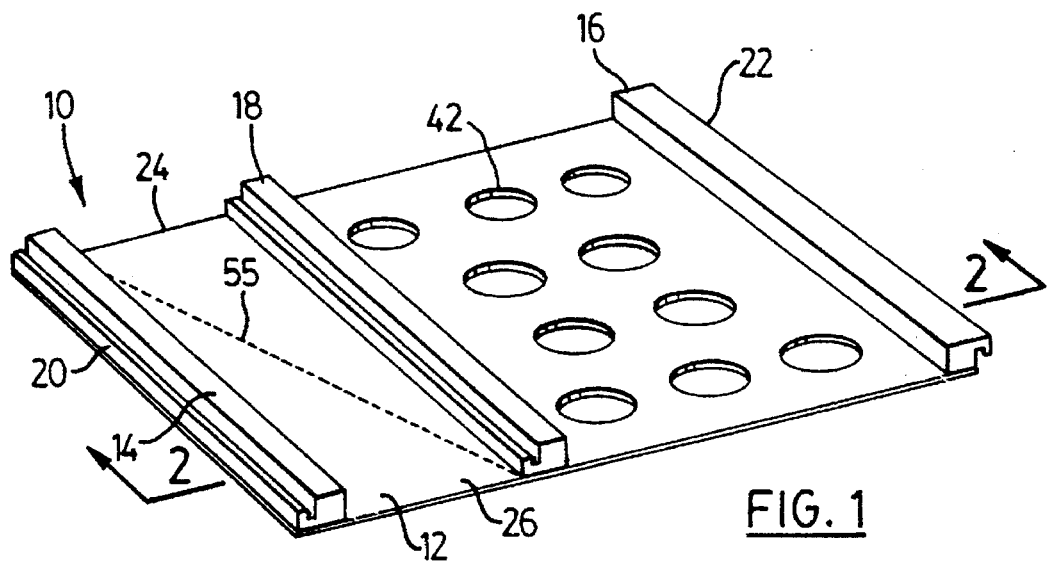
FIG. 1 is a front perspective view of a tree guard according to the present invention.

In the description which follows like parts are marked throughout the specification and drawings with the same reference numerals, respectively. The drawing figures are not necessarily drawn to scale and the proportions of certain parts have been adjusted for purposes of clarity.

Referring to FIG. 1, a preferred embodiment of a tree guard, generally indicated by reference numeral 10, according to the invention includes a generally rectangular, flexible plastic sheet 12, an optical first locking strip 14, a second locking strip 16 and a third locking strip 18.

Plastic sheet 12 is preferably a high density, u.v.-stabilized polyethylene sheet with a thickness of between 0.035 and 0.050 inches. In particular, sheeting having a thickness of approximately 0.042 inches has been found to be sufficiently flexible for most applications while still sufficiently durable to withstand repeated impacts by lawn mowers and line trimmers. Sheeting having thicknesses of less than 0.042 inches offer increased flexibility but may suffer material fatigue which is particularly prevalent when sheeting material of less than 0.035 inches is subjected to repeated impacts from a line trimmer. Material in excess 0.042 inches in thickness may not be sufficiently flexible for must applications and will also be more difficult to handle and bend. In particular, a high density polyethylene manufactured by Symplastics Limited under the product name ENVIRO-FLEX has been found to be ideal for most gardening and light agricultural applications. It will be appreciated that different plastics will have different characteristics and that the specific material chosen for a given application can vary while remaining within the scope of the invention.

Sheet 12 has a first end 20, a second end 22, a top edge 24 and a bottom edge 26. The height of the sheet 12 can be chosen to suit the particular application. In most cases a height of 6 to 8 inches has been sufficient to provide the desired level of protection against the aforementioned lawn equipment. The length of the sheet 12 can likewise be tailored to the application.

Sheet 12 has a plurality of ventilation holes 42 punched through it. Each of these holes serves to permit the evaporation of excess water that might otherwise accumulate between the tree and the guard once it is installed. The presence of excess moisture can itself serve as an aggravating factor for many plant diseases and can also produce unsightly fungal and other infections of the bark and vascular tissue. The number, positioning and size of the holes 42 will depend upon the intended application, sheeting material used and the dimensions of the guard 10.

Figure 2:
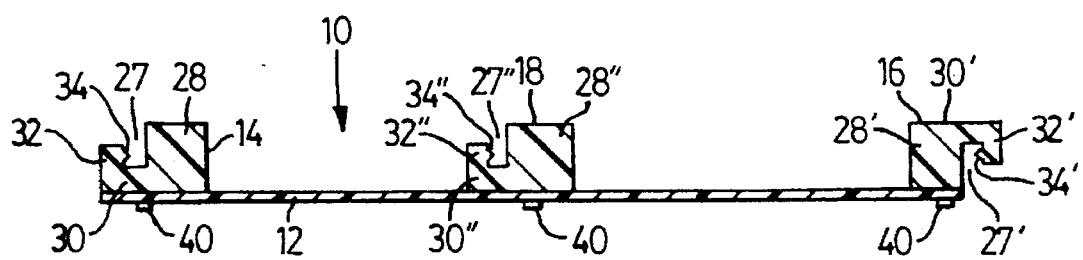
FIG. 2 is a cross-sectional view of a tree guard along line 2—2 of FIG. 1.
Figure 3:
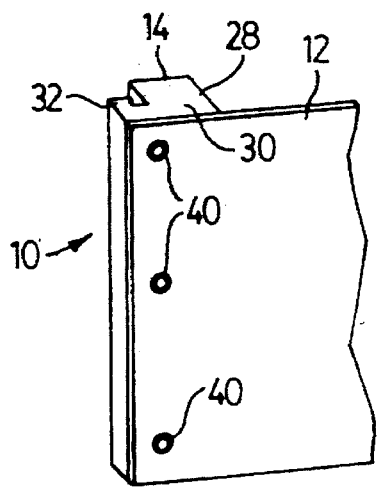
FIG. 3 is a rear perspective view of a tree guard according to the present invention.

Referring to FIGS. 1 to 3, each of first locking strip 14, second locking strip 16, and third locking strip 18 is a longitudinal c-shaped member including longitudinal groove 27 which is defined by inner wall 28, bottom wall 30 and outer wall 32. Bottom wall 30 is attached to inner wall 28, and mounted perpendicularly thereto. Outer wall 32 is attached to bottom wall 30, and extends perpendicularly therefrom a first distance. Outer wall 32 is generally parallel to inner wall 28 and spaced therefrom a second distance which is slightly greater than the thickness of outer wall 32. It is desirable that inner wall 28 be sufficiently rigid to resist transverse bending of each strip 14, 16 or 18.

Figure 4:
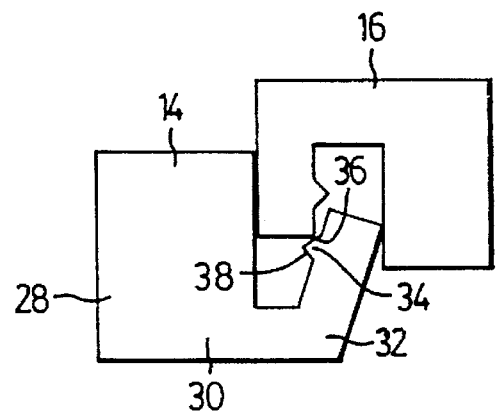
FIG. 4 is a cross-sectional view of locking strips according to the present invention in the partially closed position.

A retaining bead 34 runs substantially along outer wall 32 in groove 27. The bead 34 is desirably positioned on outer wall 32 slightly greater than one half of the first distance away from bottom wall 30. The actual shape of bead 34 may vary depending on the flexibility of the material used to manufacture the locking strip and the intended application. However, it is desirable that the bead have a camming surface 36 and a locking surface 38, which is located relatively closer to the bottom wall 30 than the camming surface 36, as shown in FIG. 4. Camming surface 36 may be angular or rounded provided that the angle of attack between the outer wall 32 and the camming surface 36 is sufficient to permit the bead 34 of one locking strip to snap over the bead 34 of another locking strip when the outer wall 32 of one strip is urged into the groove 27 of the other as described below. The angle between the outer wall and the camming surface 36 will vary with the composition and dimensions of the locking strip. However, an angle of less than 60 degrees has been found to be desirable. Locking surface 38 may be oriented at an angle sufficient to provide the required level of resistance to the removal of an outer wall 32 once inserted in a groove 27 as described above. The combined relative dimensions and angles of the beads 34 employed will determine the interlocking capabilities of locking strips 14, 16 and 18 and, therefore, the ease with which they may be zipped together and unzipped as described below. The angle between the locking surface 38 and the outer wall will vary with the composition and dimensions of the locking strip. However, an angle of less than 90° will make the strip more difficult to open whereas an angle of less than 90° will make the strip easier to open.

First locking strip 14 is attached to one face of sheet 12 and runs parallel to and along first end 20 of sheet 12 so that the outer wall 32 of that strip 14 is closest to the adjacent edge of the sheet 12, and bottom wall 30 is immediately adjacent to sheet 12 and generally parallel thereto. Each locking strip 14 to 18 must be firmly attached to the sheet 12 at the appropriate position. It has been found that ultrasonic welds 40 provide a suitably durable means of attachment. Second locking strip 16 is attached to the same face of sheet 12 as the first strip 14 and runs parallel to and along the second end 22 of sheet 12 so that inner wall 28' is immediately adjacent to sheet 12, bottom wall 30' is spaced apart from sheet 12 and generally parallel thereto, and outer wall 32' is spaced apart from sheet 12 and oriented perpendicularly thereto. Base wall 28' is desirably lined up with the peripheral edge of the sheet 12 and the second end 22. Sheet 12 should not project beyond inner wall 28' so as to partially cover groove 27' since this will interfere with the use of the strip and will not provide any substantially increased performance.

Third locking strip 18 is attached to sheet 12 at some point between the ends 20 and 22 thereof and on the same face of the sheet 12 as each of the other strips 14 and 16. It is desirably identical in form and method of attachment to first strip 14 so that bottom wall 30" of third strip 18 is immediately adjacent to and generally parallel to sheet 12 at its point of attachment.

Figure 7A:
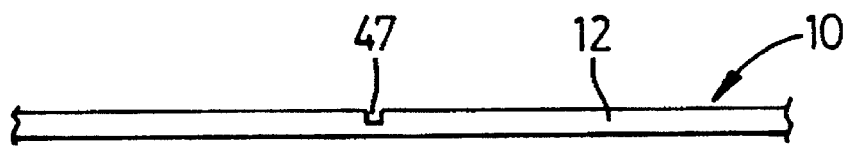
FIG. 7(a) is a bottom view of a portion of a tree guard according to the present invention.
Figure 7B:
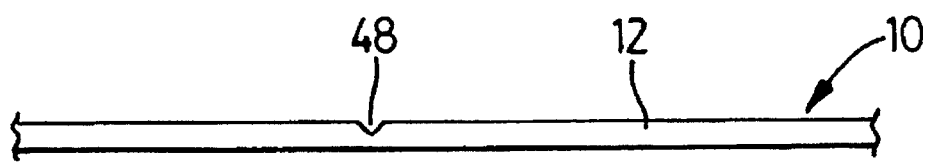
FIG. 7(b) is a bottom view of a portion of an alternative embodiment of a tree guard according to the present invention.
Figure 7C:
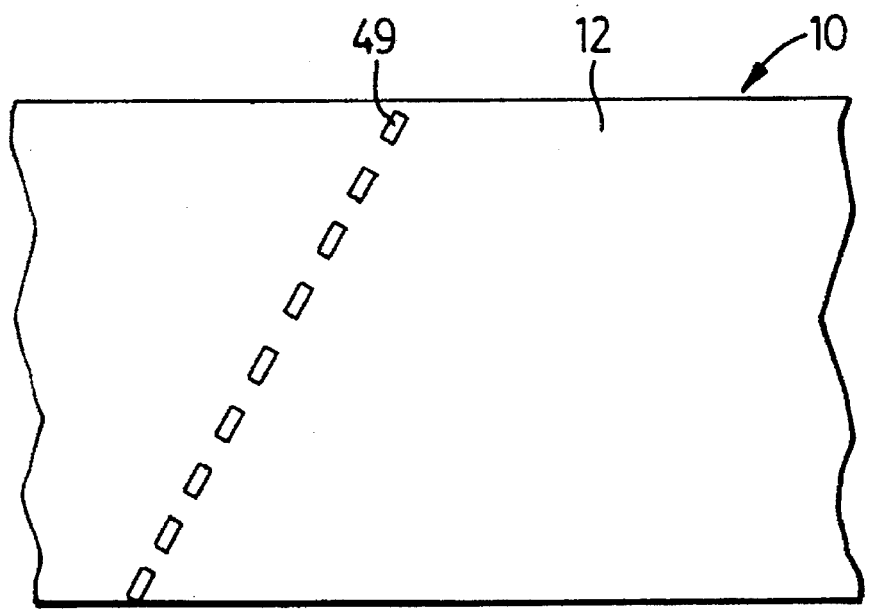
FIG. 7(c) is a plan view of a portion of an alternative embodiment of a tree guard according to the present invention.

In some applications it may be desirable to be able to leave a tree guard 10 in place around the tree without being required to remove it if the tree 50 outgrows the guard 10. It is normally recommended that this not be done since it is desirable that a minimum clearance of 40 mm be maintained between the guard 10 and the tree 50 in order to avoid trapping moisture between the trunk and guard 10. However, where it is uneconomical or impractical to remove a tree guard after a certain amount of growth, the guard 10 can be provided with a fracture line 55 in sheet 12. Fracture line 55 is a cut or depression into sheet 12 that extends partially therethrough as depicted in FIGS. 1, 7(a), 7(b) and 7(c). Fracture line 55 may be either a straight cut 47, as depicted in FIG. 7(a) or a v-cut 48, as shown in FIG. 7(b). Alternatively, Fracture line 55 may a line of perforations 49 through sheet 12, as depicted in FIG. 7(c).

Fracture line 55 should run diagonally from the top edge 24 of sheet 12, partially or fully along the length of sheet 12 and across the width thereof to the bottom edge 26, as depicted in FIGS. 1 and 7(c). This orientation of fracture line 55 will help to ensure that the guard 10 is not unduly weakened at any particular point along its length. It will be appreciated that other designs of fracture line 55 can also be employed to distribute the weakened portions of sheet 12 along its length. However, fracture line 55 should not run vertically from top edge 24 to bottom edge 26 since the sheet will tend to preferentially fold along line 55 in such circumstances. It will be appreciated that the positioning and dimensions of each cut 47 or 48 or perforation 49 of fracture line 55 and, therefore, the hoop strength of sheet 12 will depend upon the sheeting material used and the application and type of tree for which the guard is designed.

Figure 5:
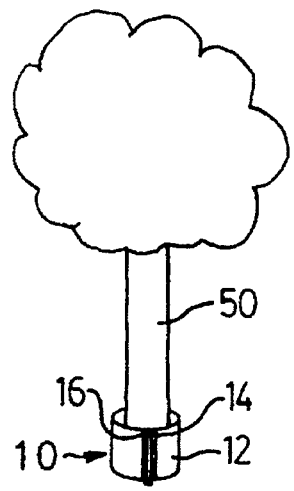
FIG. 5 is a perspective view of a tree fitted with a tree guard according to the present invention.

In use, sheet 12 is bent around tree 50, as depicted in FIG. 5, to form a cylindrical tree guard 10. In order to hold tree guard 10 in its cylindrical shape, outer wall 32 of first strip 14 is partially inserted into groove 27' of second strip 16 thereby urging outer wall 32' of second strip 16 partially into groove 27 of first strip 14. Strips 14 and 16 are then urged toward each other at either the top or bottom of the cylinder until bead 34 of first strip 14 snaps over bead 34' of second strip 16 where pressure is applied to urge them together. Strips 14 and 16 can thereafter be simply zipped together by progressively moving the point of application of the force along the combined locking strips. It will be appreciated that outer side walls 32 and 32' must be no larger than, and desirably slightly smaller than, grooves 27' and 27, respectively so that each wall will fit snugly in the respective groove.

Removal of the guard 10 is accomplished by unzipping the strips by pulling them apart at either the top or bottom and then reversing the above process. The amount of force required will depend primarily on the characteristics of each bead 34 or 34' as discussed above. When assembling the guard 10 it is desirable that the locking strips 14 to 18 be positioned on the outside of the guard 10 and not between the sheet 12 and the tree 50 since such an arrangement can cause them to be crushed against the tree 50 thereby damaging the tree.

If a narrower cylindrical guard is desired, outer wall 32' of second strip 16 may be inserted into groove 27" of third strip 18 in a manner similar to that described above in respect of the first and second strips 14 and 16, respectively. Thus a preferred embodiment of a tree guard 10 according to the invention may be collapsibly adjustable.

Figure 6:
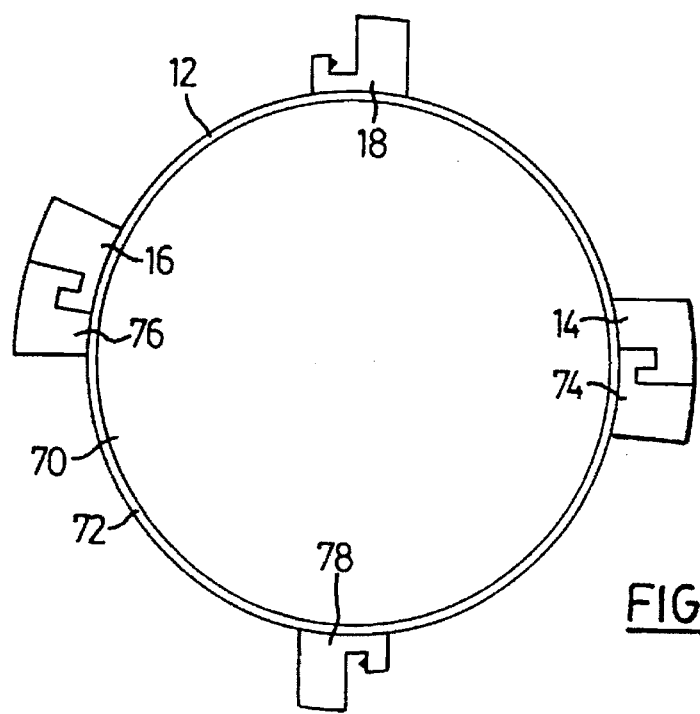
FIG. 6 is a top view of a compound tree guard according to the present invention.

If a wider cylindrical guard 70 is desired, second sheet 72, as shown in FIG. 6, may be provided which is substantially similar to sheet 12 and to which are attached complimentary locking strips 74, 76 and 78 each of which is substantially identical to one of locking strips 14, 16 and 18 attached to sheet 12. The two sheets 72 and 12 can then be strung together to form an appropriately sized compound guard 70 in much the same manner as guard 10 is assembled. Strip 74 may be interlocked with strip 14, and strip 76 interlocked with strip 16. The use of one or both of strips 18 and 78 in place of strip 16 and 76 will permit the adjustment of the guard to the appropriate diameter for a specific tree.

Tree guards according to the present invention can be manufactured by extruding a sheet of the desired sheeting material, as described above, and cutting it into appropriate widths and lengths. The length of each piece of plastic sheeting so produced may be varied depending on the desired length of the eventual guard. The piece of sheeting should be generally rectangular in shape but could also have an uneven or decorative peripheral edge, provided that any protrusions therefrom or extensions thereof will not unduly interfere with the interlocking of the locking strips on an assembled guard. Locking strip material is also be extruded in an appropriate fashion and subsequently cut to length as desired.

Ventilation holes 42 may be punched or cut into the sheet 12 in order to facilitate the ventilation of the tree trunk once the guard is installed. The ventilation holes 42 should be formed before the assembly of the guard as described below. A specialized peg hole (not shown) can also be cut into the sheeting 12 so that each assembled guard 10 can be displayed without extraneous packaging. Once all holes 42 have been cut, the locking strips 14, 16 and 18 are positioned as described above and depicted in FIG. 1. Each strip 14, 16 or 18 is then ultrasonically welded to the sheet 12 in the appropriate position and orientation to permit it to cooperate with at least one other strip, as described above.

It will be appreciated that the foregoing represents a description of specific embodiments of a tree guard according to the invention, locking strips therefor and a process of manufacturing such a guard. It will be appreciated by someone skilled in the art that various modifications and adjustments may be made while still falling within the scope of the invention.

I claim:

1. A tree guard comprising:

a generally rectangular sheet of flexible plastic having a first face, a second face, a first end and a second end;

a first elongate locking strip attached to and running along said first end of said sheet and including a bottom wall, an inner side wall and an outer side wall, the three walls defining a U-shaped groove and one of said side walls having a retaining bead running along it; and a second elongate locking strip including a locking flange generally complimentary in shape to said groove and having retaining means for engaging said retaining bead of said first locking strip when said locking flange is inserted into said groove, said second elongate locking strip being attached to said second end of said sheet and arranged generally parallel to said first locking strip; and a third locking strip attached to said sheet, substantially identical in structure to said first locking strip, spaced between said first locking strip and said second locking strip and generally parallel thereto, and adapted to engage said second locking strip.

2. A tree guard as claimed in claim 1 wherein said sheet is diagonally scored along part of its length and is bendable as so to form a cylinder with said first end adjacent to said second end.

3. A tree guard comprising:

a generally rectangular sheet of flexible plastic having a first face, a second face, a first end and a second end;

a first elongate locking strip attached to and running along said first end of said sheet and including a bottom wall, an inner side wall and an outer side wall, the three walls defining a U-shaped groove, said first locking strip including an elongate base portion, which includes said inner side wall, and a first elongate, flexible, L-shaped flange, which includes said bottom wall and said outer side wall, attached to said base portion and extending therefrom, said bottom wall running along said inner side wall and projecting generally perpendicularly therefrom a first distance, said outer side wall running along said bottom wall and projecting generally perpendicularly therefrom a second distance and having a first thickness smaller than the first distance, said outer side wall having a retaining bead running along it, said retaining bead being spaced from said bottom wall a third distance; and a second elongate locking strip including a locking flange generally complimentary in shape to said groove and having retaining means for engaging said retaining bead when said locking flange is inserted into said groove, said second elongate locking strip being attached to said second end of said sheet mad arranged generally parallel to said first locking strip.

4. A tree guard as claimed in claim 3, wherein said second locking strip includes an elongate base portion, which includes an inner side wall, and an elongate, flexible, L-shaped flange, which includes a second outer side wall, attached to said base portion of the second locking strip.

5. A tree guard as claimed in claim 3, wherein said retaining bead is a first retaining bead, and wherein said retaining means is a second retaining bead substantially identical to said first retaining bead, running along an outer side wall of said second locking strip.

6. A tree guard as claimed in claim 5, wherein the first retaining bead is tapered away from the bottom wall, and wherein the second retaining bead is tapered.

7. A tree guard as claimed in claim 3, wherein said second locking strip is identical in cross-section to said first locking strip.

8. A tree guard as claimed in claim 3, and further comprising a third locking strip attached to said first face of the sheet in a manner substantially identical to said first locking strip and which is substantially identical to the first locking strip, spaced therefrom and generally parallel thereto.

* * * * *